(12) United States Patent
Dabrowski (10) Patent No.: US 8,123,613 B2
(45) Date of Patent: Feb. 28, 2012

(54) METHOD AND APPARATUS FOR INTEGRATED CUSTOMER TRACKING AND BROWSING

(76) Inventor: Stanley Dabrowski, Las Vegas, NV (US)

( * ) Notice: Subject to any disclaimer, the term of this patent is extended or adjusted under 35 U.S.C. 154(b) by 487 days.

(21) Appl. No.: 12/046,110

(22) Filed: Mar. 11, 2008

(65) Prior Publication Data

US 2008/0214295 A1    Sep. 4, 2008

Related U.S. Application Data

(63) Continuation-in-part of application No. 10/261,142, filed on Sep. 30, 2002, now Pat. No. 7,341,516.

(51) Int. Cl.
*A63F 9/24* (2006.01)
(52) U.S. Cl. .......................................................... 463/25
(58) Field of Classification Search .................... 463/25, 463/16
See application file for complete search history.

(56) References Cited

U.S. PATENT DOCUMENTS

| | | | |
|---|---|---|---|
| 4,283,709 A | 8/1981 | Lucero et al. | |
| 4,636,951 A | 1/1987 | Harlick | |
| 4,764,666 A | 8/1988 | Bergeron | |
| 4,880,237 A | 11/1989 | Kishishita | |
| 5,083,022 A | 1/1992 | Miyamoto et al. | |
| 5,179,517 A * | 1/1993 | Sarbin et al. ................. | 463/25 |
| 5,239,165 A | 8/1993 | Novak | |
| 5,265,874 A | 11/1993 | Dickinson et al. | |
| 5,290,033 A | 3/1994 | Bittner et al. | |
| 5,321,241 A | 6/1994 | Craine | |
| 5,371,345 A | 12/1994 | LeStrange et al. | |
| 5,470,079 A | 11/1995 | LeStrange et al. | |
| 5,627,356 A | 5/1997 | Takemoto et al. | |
| 5,709,603 A | 1/1998 | Kaye | |
| 5,761,647 A * | 6/1998 | Boushy ........................ | 705/10 |
| 5,772,510 A | 6/1998 | Roberts | |
| 6,012,832 A | 1/2000 | Saunders et al. | |
| 6,014,594 A | 1/2000 | Heidel et al. | |
| 6,048,269 A | 4/2000 | Burns et al. | |
| 6,113,492 A | 9/2000 | Walker et al. | |
| 6,128,550 A | 10/2000 | Heidel et al. | |
| 6,227,972 B1 | 5/2001 | Walker et al. | |
| 6,231,445 B1 | 5/2001 | Acres | |
| 6,253,119 B1 | 6/2001 | Dabrowski | |
| 6,340,331 B1 | 1/2002 | Saunders et al. | |
| 6,577,733 B1 * | 6/2003 | Charrin ......................... | 380/251 |
| 6,607,441 B1 * | 8/2003 | Acres .............................. | 463/25 |
| 6,712,698 B2 | 3/2004 | Paulsen et al. | |
| 6,722,985 B2 | 4/2004 | Criss-Puszkiewicz et al. | |
| 6,896,618 B2 | 5/2005 | Benoy et al. | |
| 7,036,012 B2 | 4/2006 | Charrin | |

FOREIGN PATENT DOCUMENTS

| | | |
|---|---|---|
| WO | 9416781 | 8/1994 |
| WO | 9859331 | 12/1998 |

* cited by examiner

*Primary Examiner* — Omkar Deodhar (74) *Attorney, Agent, or Firm* — Gates & Cooper LLP (57) ABSTRACT

A system and method for tracking customer activity without need for an extensive interconnecting network. The system includes a plurality of gaming devices that are communicatively isolated from one another. Information, including tracked customer activity, bonus requirements, and in one embodiment, personal information, is stored on a memory device communicable with the gaming devices. This allows implementation of an incentive program at reduced cost because the service devices themselves need not be networked together.

20 Claims, 9 Drawing Sheets

METHOD AND APPARATUS FOR INTEGRATED CUSTOMER TRACKING AND BROWSING

CROSS-REFERENCE TO RELATED APPLICATIONS

This application is a Continuation-in-Part of U.S. patent application Ser. No. 10/261,142, entitled "METHOD AND APPARATUS FOR INTEGRATED CUSTOMER TRACKING AND BROWSING," By Stanley P. Dabrowski, filed Sep. 30, 2002, issued Mar. 11, 2008 as U.S. Pat. No. 7,341,516, which application is hereby incorporated by reference herein.

BACKGROUND OF THE INVENTION

1. Field of the Invention

The present invention relates to systems and methods for monitoring and recording transactions, and in particular, to a system and method for tracking customer activity without need for an extensive interconnecting network.

2. Description of the Related Art

Recent years have seen a rapid expansion of the gaming industry. Much of the income derived from such games is collected at gaming devices like slot machines and video poker games.

To attract customers, larger goods and/or service providers (e.g. gaming establishments) implement "frequent player" programs in which players can obtain bonuses and other benefits each time they play machines in that particular establishment or its affiliates. Such "frequent player" or "loyalty" programs may also permit the goods/service provider to monitor customer activity. This permits the service/goods provider to customize the services and goods presented to each customer or group of customers so that each customer's needs are better met. In many instances, the customer agrees to permit the collection of such information in exchange for lower prices, a bonus program, or other incentives offered by the service/goods provider. In such circumstances, it is important to include some medium or means for keeping track of each customer's loyalty program.

One solution to this problem is to provide a network of interconnected computers or similar devices at the point of sale/service. Each device can collect information regarding the sale and provide that information to a central database, where the data can be stored and analyzed. The problem with this solution is that it requires a substantial investment in the infrastructure (the interconnected network) itself. This substantial investment is typically greater than can be provided by smaller goods/service providers.

Another problem with the use of a network of interconnected computers or similar devices at the point of sale/service is that such systems do not ordinarily permit the user to earn incentives at different establishments. For example, whatever device is used to keep track of one entity's incentive program is typically unusable in for another entity's incentive program. This forces the customer to carry a device for each establishment they patronize.

Typically, customers are not permitted to earn incentives at a first establishment by purchasing goods or services at another unrelated establishment. For example, if a customer is a member of the incentive program of a first casino, game play at a second casino cannot be used to earn incentives at the first casino. Also incentives earned at the first casino cannot be redeemed at the second casino. While it may not seem advantageous for the second casino to allow customers to redeem incentives earned at another commercially distinct casino, allowing the player to make such redemption encourages the customer to play at the second casino, and once they begin playing there, they are likely to remain.

What is needed is an inexpensive system and method for monitoring and recording gaming activity that eases data collection, reduces the risk of theft, does not negatively influence impulse gaming. What is also needed is a system for providing appropriate incentives, without need for an extensive (and expensive) infrastructure, and one that permits customers to earn and redeem incentives at commercially distinct casinos. The present invention satisfies these needs.

SUMMARY OF THE INVENTION

To address the requirements described above, the present invention discloses a method, apparatus, article of manufacture, and a memory structure for providing gaming incentives. The method comprising the steps of receiving a first transmission from a secure memory device in a terminal communicatively coupled to one of a plurality of first gaming devices of a first casino, collecting first information describing member-related gaming device activity of the one of the plurality of first gaming devices, securely transmitting the first information regarding the member-related gaming device activity to the memory device for storage in the secure memory, receiving a second transmission from the secure memory device in a second terminal communicatively coupled to one of a second plurality of gaming devices of a second casino commercially distinct from the first casino, enrolling the member of the first incentive program of the first casino in a second incentive program of the second casino, collecting second information describing member-related gaming device activity of the one of the second plurality of gaming devices of the second casino, and securely transmitting the second information regarding the member-related gaming device activity to the memory device for storage in the secure memory.

In another embodiment, the apparatus comprises means for receiving a first transmission from a secure memory device in a terminal communicatively coupled to one of a plurality of first gaming devices of a first casino, means for collecting first information describing member-related gaming device activity of the one of the plurality of first gaming devices, means for securely transmitting the first information regarding the member-related gaming device activity to the memory device for storage in the secure memory, means for receiving a second transmission from the secure memory device in a second terminal communicatively coupled to one of a second plurality of gaming devices of a second casino commercially distinct from the first casino, means for enrolling the member of the first incentive program of the first casino in a second incentive program of the second casino, means for collecting second information describing member-related gaming device activity of the one of the second plurality of gaming devices of the second casino, means for securely transmitting the second information regarding the member-related gaming device activity to the memory device for storage in the secure memory.

In one embodiment, the secure memory device is issued to a member of a first incentive program of the first casino, the memory device having a secure memory for storing and retrieving tamperproof customer incentive information and a customer-unique identifier, the terminal exchanges information between the secure memory device and the one of the plurality of gaming devices and the plurality of first gaming devices includes at least a subset of first gaming devices that are communicatively isolated from any entity communicatively connected with any of the other of the plurality of first gaming devices. Further, the second terminal exchanges information between the secure memory device and the one of the second plurality of gaming devices and the plurality of second gaming devices includes at least a subset of second gaming devices that are communicatively isolated from any entity communicatively connected with any of the other of the plurality of second gaming devices.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
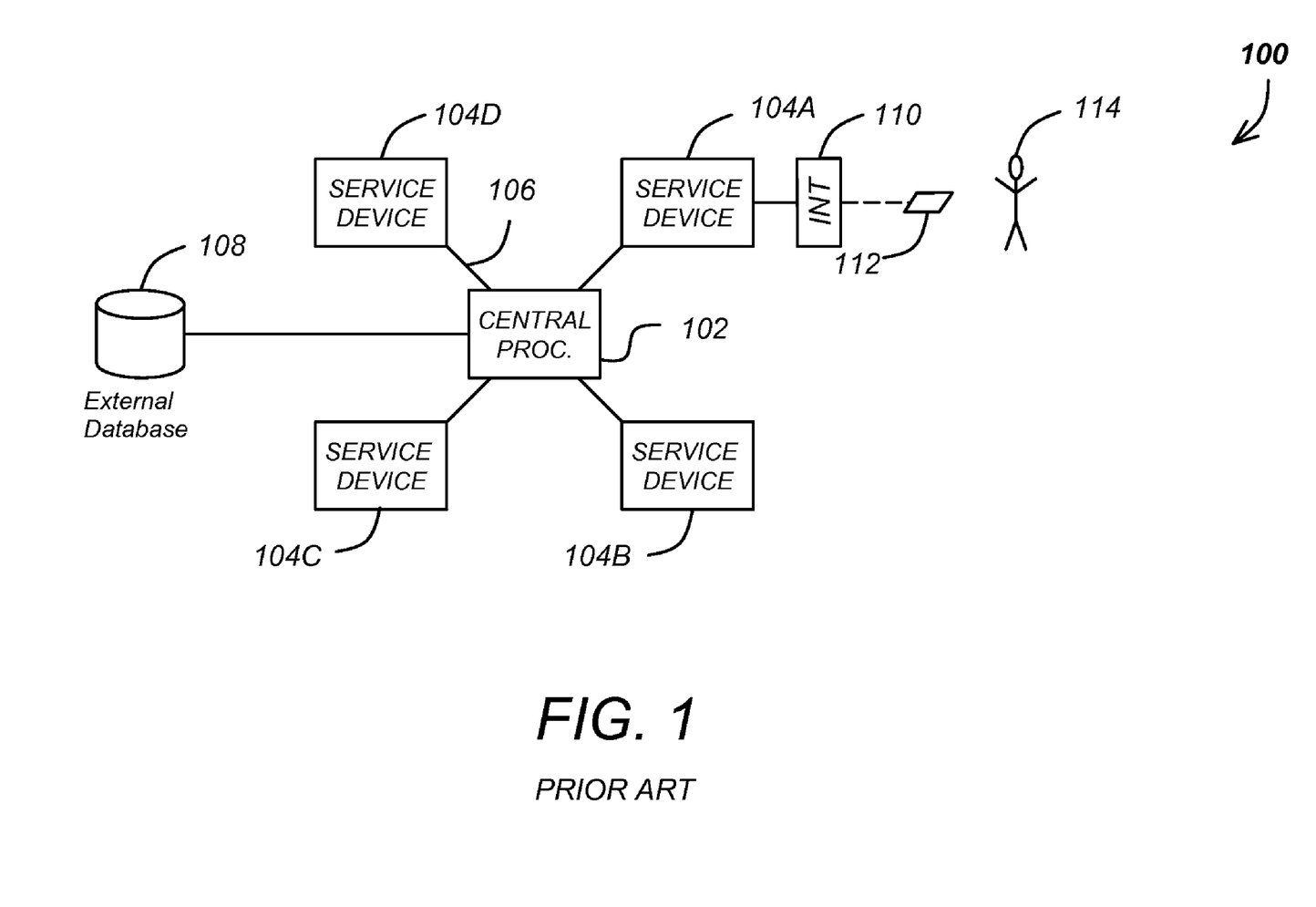
FIG. 1 is a diagram of a plurality of service devices in a networked configuration.

FIG. 1 is a diagram of a networked (e.g. communicatively interconnected) plurality of service devices. The service device network 100 includes a plurality of service devices 104A-104C (alternatively referred to as service device(s) 104), each coupled to a central processor 102 via network links 106. The central processor 102 can be coupled to an internal or external database 108. The service devices 104 can be vending machines, gaming machines, video games, or any other machine that provides goods and/or services to customers. A consumer 114 interfaces with the service devices 104 using input/output (I/O) devices on the service devices. For example, when the service devices 104 are gaming machines, the consumer or user 114 uses the I/O devices to provide monetary value to the gaming device, and depending on the game, may provide other gaming and other inputs as well. The gaming device provides an output display showing the results and status of each game.

The owner or operator of the service device network 100 may elect to provide an incentive program to attract more consumers. The incentive program provides the member a reward for consuming the goods or using the service devices 104. The reward may be provided simply to attract more consumers 114, or may be provided in exchange for personal information regarding the consumer 114 or the consumer's preferences and habits regarding the use/consumption of the goods/services offered by the service devices 104. In one embodiment the incentive program is implemented by use of loyalty cards or other devices 112 that identify the consumer 114. When the consumer 114 enters the device 112 into an interface 110, the consumer 114 is identified, and information regarding the use of the service device 104 by the consumer 114 can be transmitted to the central processor 102 for processing and storage in a database 108, which can be external or internal to the processor 102. The device 112, can be a read only device, such as an optical bar code or magnetic card, or may be a read/write device.

Unfortunately, the incentive programs based on the service device network 110 require that each of the service devices 104 be networked together. Such networks can be prohibitively expensive for smaller service device owner/operators.

Figure 2:
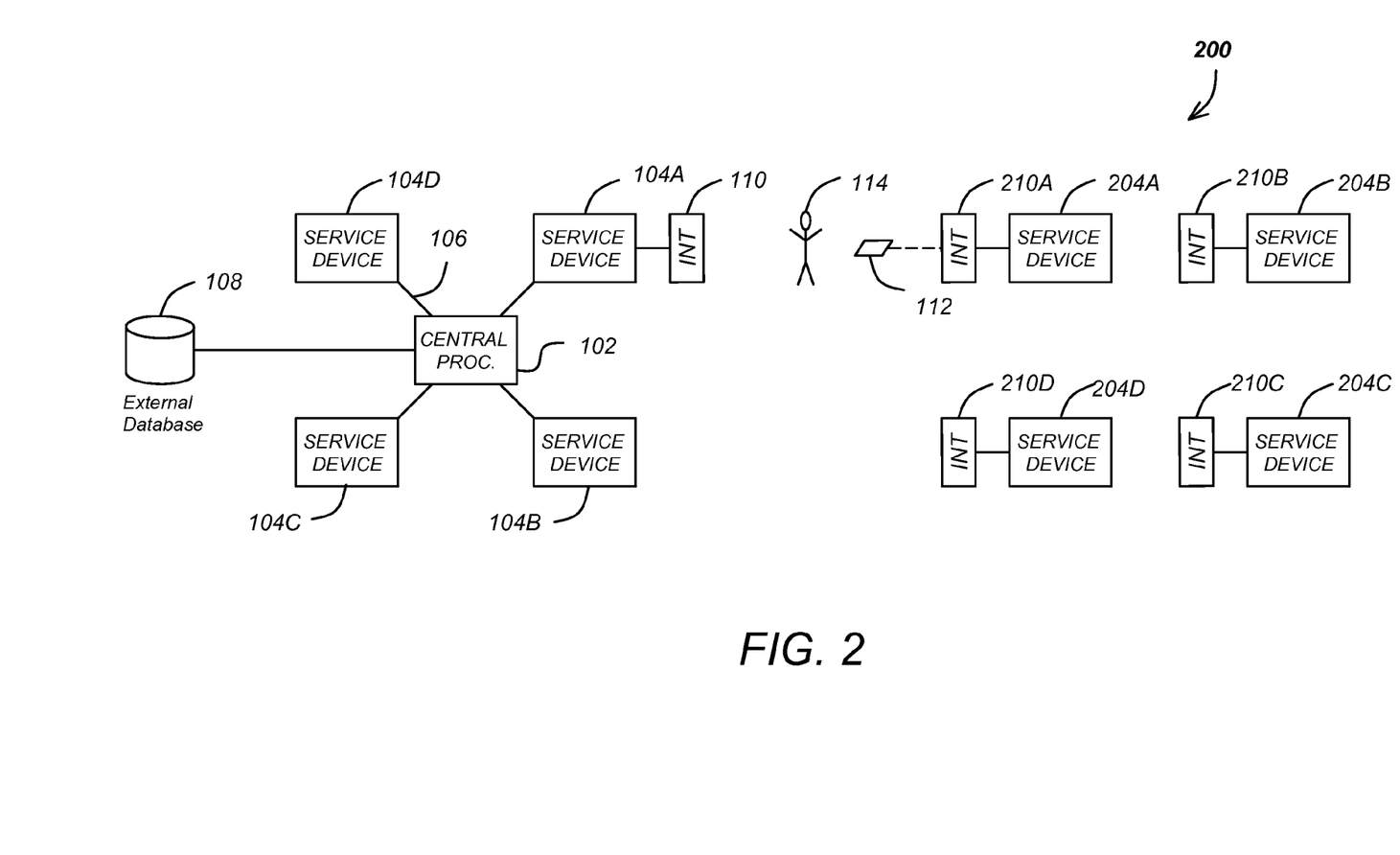
FIG. 2 is a diagram of a plurality of service devices, a subset of which are in a non-networked configuration.

FIG. 2 is a diagram of a diagram of hybrid service device network, which includes an interconnected service device network 100 and a distributed service device network (DSDN) 200. The DSDN 200 comprises a plurality of service devices 204A-204B such as gaming devices (hereinafter referred to alternatively as gaming devices or service device (s) 204). Unlike the interconnected service device network 100, the service devices 204 of the DSDN 200 are communicatively isolated (they are not networked together). Each of the service devices 204A-204D includes an associated terminal 210A-210D that can accept a memory device 112. In one embodiment, the memory device 112 is a programmably alterable memory device such as a smart card, flash memory, secure digital card, or radio frequency identification (RFID) device. Hereinafter, the terms memory device, smartcard, token, and RFID device are used interchangeably to describe this functionality. Similarly, in one embodiment, the terminals 210A-210D may include smartcard reader/writers (210A-210D) (hereinafter also referred to as SRWs 210).

Once the smartcard 112 is accepted, the SRW 210 can read and write data from the smartcard 112. The smartcard 112 and SRW 210 are each configured so that read and write operations are performed in a secure (non-hackable) way, and so that the contents of the smartcard 112 cannot be altered or duplicated without special authorization. The SRW 210 may also be capable of selecting different operational modes or reprogramming the smartcard 112.

The smartcard 112 is personal to the user 114 and contains the information required for the incentive program. In one embodiment, this information includes personal data about the member 114. In another embodiment (the opt-out embodiment described below), the smartcard 112 does not store personal data about the member 114.

Once connected to the service device 210, the smartcard extracts service device activity information. In the gaming establishment context, this service device activity information includes player input(s), gaming machine outcome(s). Input and outcomes can be recorded as singular events. For example, the service device activity can be described (and recorded) as a number of games played, a number of games played per week, a number of games played on particular days or at particular times, the number of wagers, the number of wagers within certain amount bins (e.g. $0.25, $1, or $5), number of particular outcomes (e.g. number of blackjacks, or royal flushes, or queens), combinations (e.g. number of hands with face cards and deuces, number of consecutive winning or non-winning hands). Further, the tracked outcomes can be customizable to the member 114. For example, the member 114 may select particular "lucky" combinations (personal bonus combinations) for bonus awards (e.g. number of hands with both deuces and queens), and the member's selection can be stored on the smartcard 112 thereby permitting the member 114 to earn bonuses for these result.

The foregoing information can be used to compute and store member bonuses, and to manage special member offers.

Figure 3:
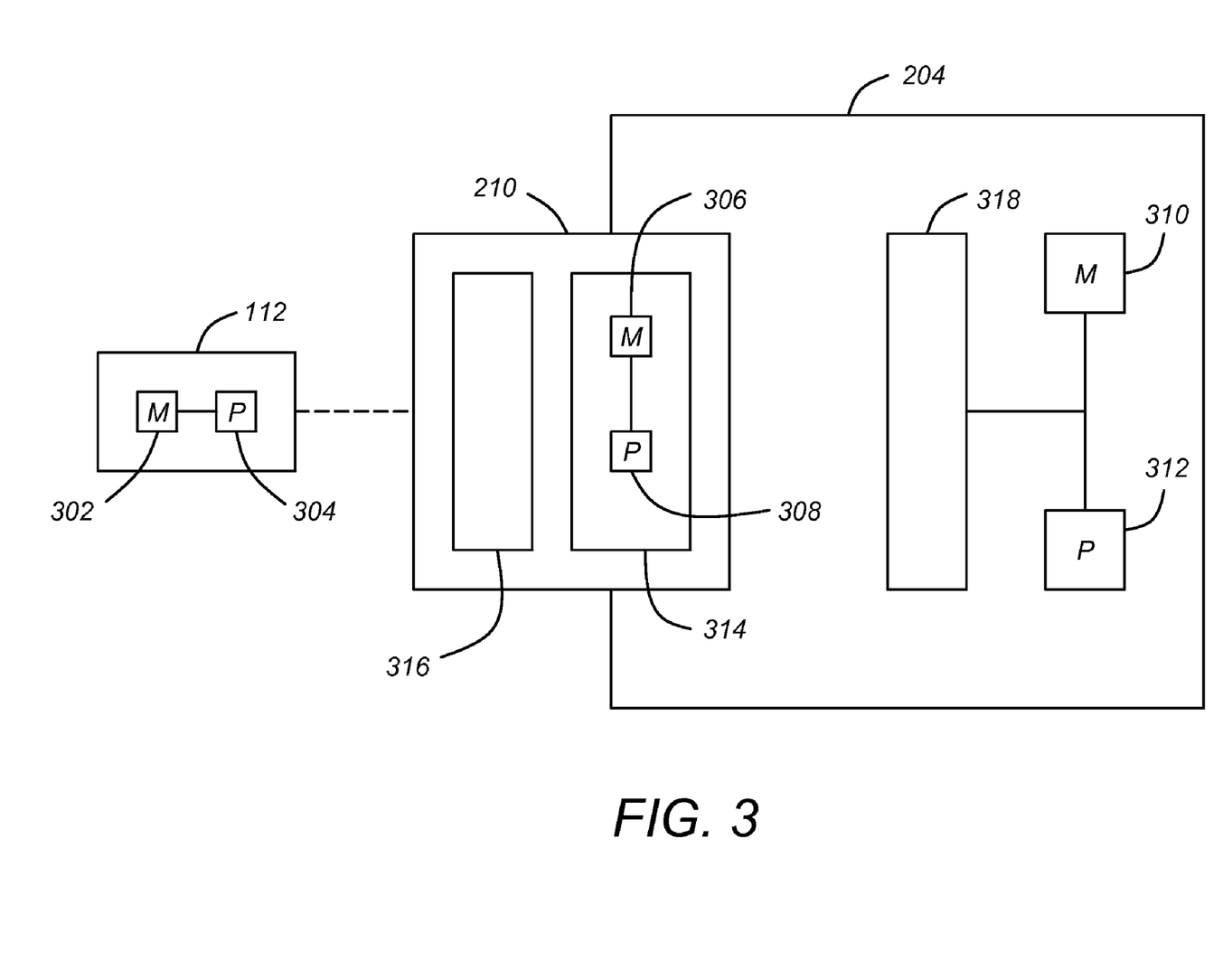
FIG. 3 is a diagram of a memory device, terminal and service device.

FIG. 3 is a diagram depicting a memory device 112, terminal 210, and service device 204. In one embodiment, the memory device 112 includes an internal memory 302 and a processor 304. The memory 302 comprises non-volatile memory storage which may include both read only memory (ROM) and randomly addressable memory (RAM). The memory 302 may also include a secure memory area for storing passwords, and sensitive data used to implement security routines. The processor 304 response to instructions that may be stored in the memory 302, and performs the memory device-related functions described herein.

The memory device 112 may be a smartcard, a flash memory such as a USB flash drive, a secure memory such as a Secure Digital card, or an radio frequency identification (RFID) device. RFID devices may include passive devices, semi-passive devices, active devices, and extended capability devices. Passive devices have no internal power supply, but use the electrical current induced in its antenna by a nearby RF signal to power the device. The response of the passive device may be a simply ID number, but may include additional data read from the non-volatile memory. Passive RFID devices may have privacy enhancing functionality such as communication encryption and silent moding, which prevents the device from transmitting information unless the user authorizes the transmission. Active RFID devices include their own internal power source and may include processors and other circuits. Extended capability RFID devices include similar features.

Each of the terminals 210 includes a controller 314 and a read/write device 316. The controller 314 communicates with the smartcard via the read/write device 316. Communication between the terminal 210 and the service device 210 may be performed via an interface 318 which obtains status and other information from the service device 210.

In one embodiment, the memory device 112 is removably coupleable to the terminal 210. In another embodiment described below, the memory device 112 is a wireless device that can exchange information with the terminal without physical connection. Once in communication with the terminal 210 the memory device 112 and the terminal 210 can share information as required to implement the incentive program. The terminal 210 (e.g. SRW may include an internal memory 306 communicatively coupled to a SRW processor 304. The internal memory 306 may include RAM and/or ROM.

The terminal is communicatively (and may be physically) coupled to the service device 204. Although not necessary to practice the invention, the service device 204 typically includes a processor 312 and a memory 310 that is used to implement service device 204 functions.

Figure 4:
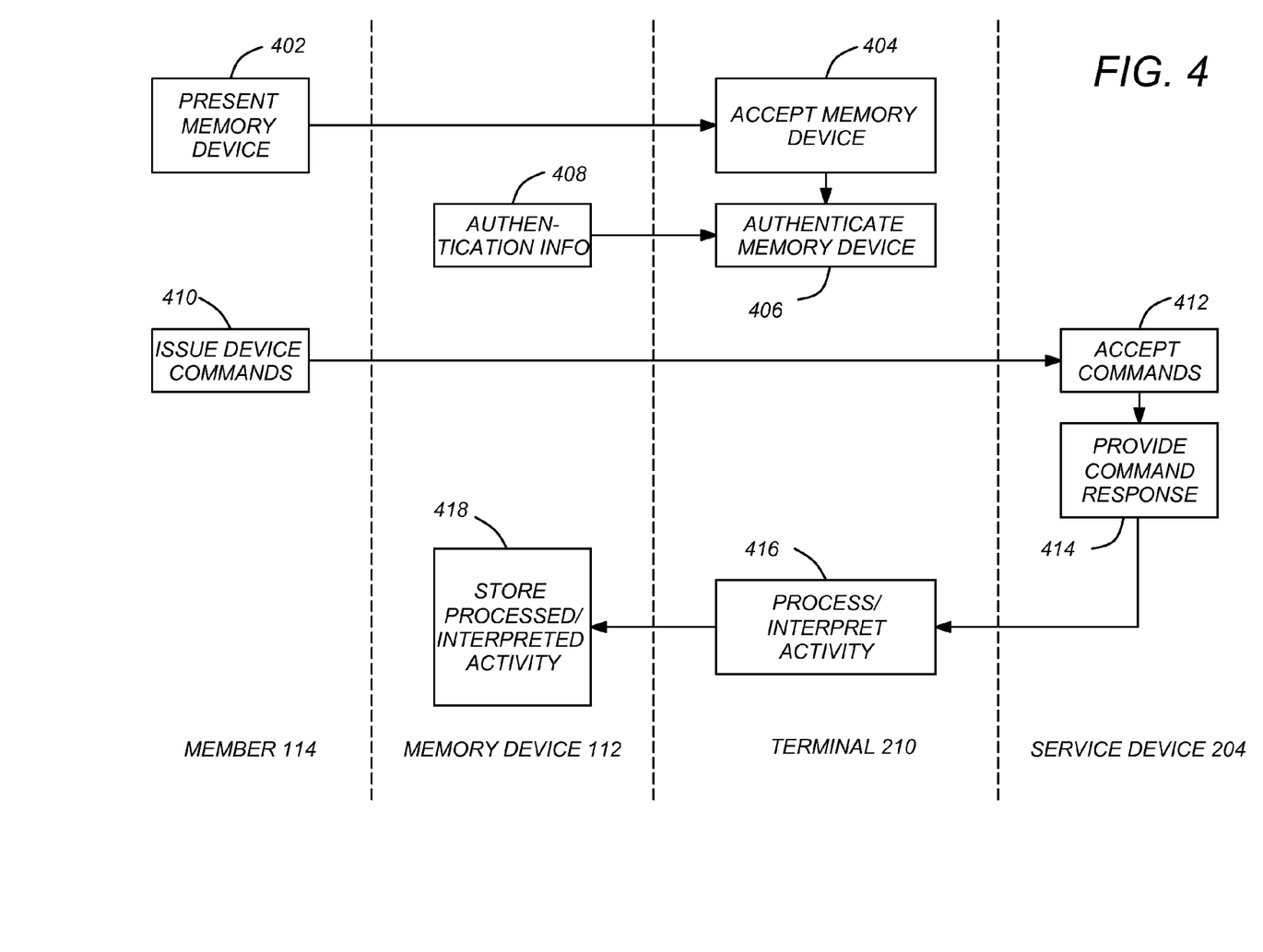
FIG. 4 is a diagram showing exemplary operations usable to collect customer-related service device activity.

FIG. 4 is a diagram showing exemplary method steps useable to collect member-related service device 204 activity. The member 114 presents 402 the memory device 112 to the terminal 210, which accepts 404 and authenticates 406 the memory device 112 using authentication information 408 stored in the memory device 112 and/or the terminal 210. In one embodiment, the terminal 210 requests that the member 114 enter identifying information (e.g. a name and/or a password) as a part of the authentication process. If desired, the present invention can be implemented without blocks 402-408. In this embodiment, the possessor of the memory device 112 is not authenticated.

The member 114 then issues 410 service device 204 commands via an appropriate service device user interface. This may include, for example, entering a monetary denomination (e.g. a $20 bill), and depressing buttons to select game play, including the number of credits to risk, and making additional selections regarding game play (e.g. in a draw poker game, which cards to retain). The service device 204 accepts 412 the commands, and provides 414 a command response. The terminal 210 processes and/or interprets 416 the command response from the service device 204 and provides the activity information, in processed or unprocessed form, to the memory device 112, where it is stored 418.

Some or all of the terminals 210 also may allow member 114 to read some or all of the information regarding earned bonuses, bonus detail (e.g. number of bonus points, how many jackpots or royal flushes), or bonus requirements stored on the smartcard 112.

FIGS. 3 and 4 show an embodiment of the invention wherein the terminal 210 includes a processor 308 and memory 306 that is used to process and/or interpret the service device 204 activity. However, the processor 304 and memory 302 in the memory device 112 can also perform many or all of the functions performed by the terminal 210 processor 308 and memory 306. This embodiment permits the present invention to be implemented with a minimum investment in terminal 210 hardware. Sharing functionality between the memory device and the terminal 210 can also increase security and prevent hacking of the memory device 112 and/or the terminal 210.

Figure 5:
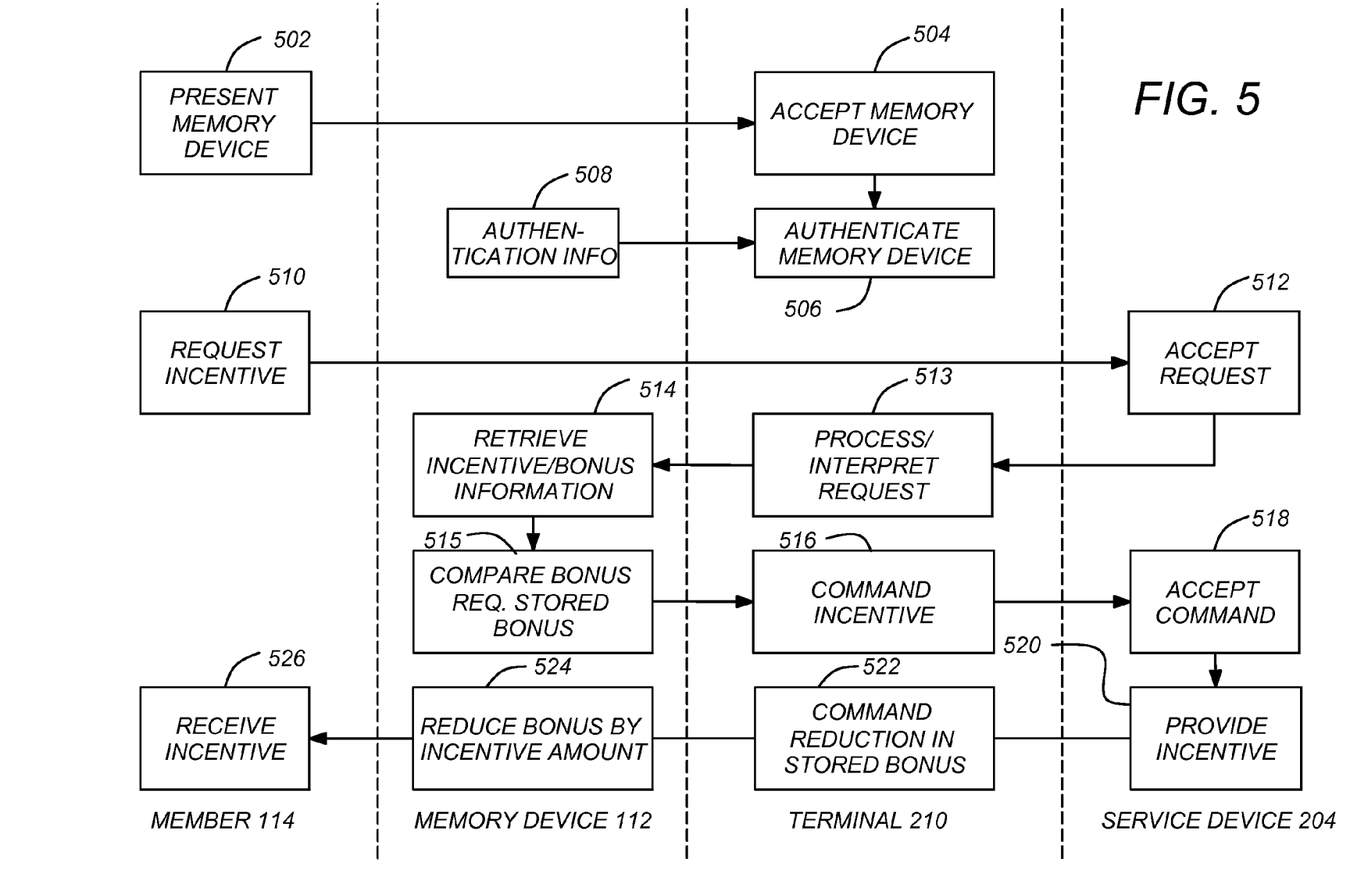
FIG. 5 is a diagram showing exemplary operations usable to use incentives earned based on stored information derived from customer related device activity.

FIG. 5 is a diagram depicting exemplary method steps used to redeem incentives. The member 114 presents 502 the memory device 112 to the terminal 210, where it is accepted 504. Authentication information 508 stored in the memory device 112 and/or the terminal 210 is then used to authenticate the member 114. As before, this could involve a process whereby the member 114 provides input to the terminal and/or the service device 204 (service device 204 I/O elements can be used to provide input/output interface during authentication, accumulating bonus incentives, or in receiving incentives).

The authentication process can be directed solely to processes that are required to authenticate the memory device 112, rather than the user (e.g., a case where possession of the card alone is sufficient). In this case, the member 114 accepts the risk of losing their memory device 112. Redemption devices may or may not be networked.

The member 114 then requests 510 the incentive. The terminal service device 204 (either directly, or through the I/O devices of the terminal 210) accepts 512 the request. The terminal 210 processes/interprets 513 the request. The terminal 210 transmits a message to the memory device 112 requesting incentive/bonus information stored in the memory 302 of the memory device 112. The memory device 112 retrieves 514 the information, and provides the information to the terminal 210. The terminal 210 then compares 515 the earned bonus/incentive information received from the memory device 112 with bonus/incentive requirements stored in the terminal 210 and/or the memory device 112 and/or the service device 204. If the comparison indicates a bonus/incentive award is appropriate, the terminal/memory device 210/112 provides 516 a command to the service device 204 to provide the incentive. The service device 204 accepts 518 the command, and provides 520 the bonus/incentive. The terminal 210 receives the directive to provide the incentive from the service device, and commands the memory device 112 to decrement 510 the earned bonus by the amount redeemed. The memory device 112 accepts this command, and decrements 524 the earned bonus by the required amount. If desired, the present invention can be implemented without decrementing the bonus counter (e.g. awarding incentives when bonus thresholds are passed and therefore, triggered).

The incentive is then received 526 by the member 114. Alternatively, the incentive command may cause an alarm or other indication that the member 114, should be provided with a bonus, and the bonus is provided to the user by appropriate personnel alerted by the alarm.

The memory device 112 may or may not keep historical data regarding redemption transactions and earned bonuses. When the member 114 redeems bonus points or interfaces with a networked machine, the history of activity/bonus awards stored in the smartcard 112 can be uploaded in the terminal 210. This information can be to offer the member 114 with additional player benefits or to update the bonus structure to a more or less favorable structure than currently stored in the card 112.

In one embodiment, special redemption stations can be used to collect bonus points (in addition to or in the alternative to the terminals 210 disclosed above). Such redemption stations can be networked and can include special functionality to permit the collection of data and the issuance of the incentive awards.

It is noted that the functions shown implemented in the memory device 112 and terminal 210 in FIG. 5 may be different than shown. For example, the memory device 112 may include stored incentive/bonus requirements, and the determination if the earned requirements permit an award can take place in the memory device 112 instead of (or in addition to) the terminal 210.

The foregoing can be implemented with 2 types of memory devices, an opt-in memory device, and a non-opt-in (or opt-out) memory device 112. The baseline (opt-out), card is anonymous, and offers the member 114 a different (and typically, less advantageous) bonus structure than does the opt-in memory device 112. The opt-in memory device 112 is provided to the user in exchange for the member 114 providing personal information their name, address, and other identifying information that may be useful to correlate with service device 204 use patterns. Such a card may provide increased benefits over the non-opt-in card (i.e. 2-cent bonus per dollar wagered versus a 1 cent per dollar wagered with the opt-put card). Further, either card may change the award as the amount of play (dollars wagered or games played) increases, or when the user plays (giving more bonus for off-peak hours). The opt-in card can also be updated from time to time, with additional information, permitting additional bonuses. For example, an opt-out card may provide 1 cent per dollar wagered, a standard opt-in card may provide 2 cents per dollar wagered, but based on how much the opt-in card is used, the rate of award may be increased as the member plays more. This is made possible because the memory device processor can include programs which allow changes in program execution, permitting adaptable bonus awards.

The foregoing invention can also be used with a networked service device incentive system. In this embodiment (illustrated in FIG. 2), the member 114 can use the service devices 204 in the system 200, accumulating bonus points, and if desired, redeeming earned bonus points at any of the service devices 204. However, in this embodiment, the member 114 can also present the memory device 112 to a service device 104 in the networked system. In one embodiment, this functionality duplicates that of the un-networked system (i.e. the service device 104 communicates solely with the members memory device 114) to accumulate bonus points or award bonuses. In another embodiment, the memory device 112 or the service device communicatively coupled thereto, interfaces with other service devices in the network 100, the server 102, and/or the database 108 to accumulate bonus points, award earned bonuses, or simply to report the data stored in the memory device 112 or store updated information regarding bonus requirements. In this embodiment, the memory device 112 operates primarily autonomously but can operate with the networked system when it is desired or available. This permits the occasional collection and retention of data regarding member 114 bonus points and service device activity. This permits opt-in users to retain their earned bonuses, even when the smartcard is lost or stolen, and provides another incentive for members 114 to become opted-in members.

One advantage in the foregoing system (with non-networked service devices) is that it permits the customers/members to determine for themselves when and if they would like to trade information regarding gaming activity (and/or personal information) for bonus incentives. For example, a system can be devised in which none of the service devices are networked or otherwise coupled to a central computer or database, and which redemption of bonus points takes place on clearly identified and networked redemption terminals. The customer can then use the smartcard 112 in the ordinary way, secure in the knowledge that gaming activity or personal information will not (indeed, cannot) be shared. However, when the user elects to redeem earned bonus points, the user presents the card to a conspicuously identified networked machine, the information on the card (including game play and optionally, the user's personal information) can be collected. If the user does elects not to collect the bonus, the gaming activity or personal information is never revealed, but remains stored on the smartcard. The customer is therefore assured that activity and/or personal information stored in the smartcard will not be read until the customer makes the decision as to whether and when they would like to trade personal information for the incentive program.

In yet another embodiment of the invention, the member 114 does not have to make an immediate decision regarding whether to become an opted-in member. In this embodiment, the member 114 accepts an opted-out card, and can use the card as described above to collect bonus points. When the user attempts to redeem the bonus points for the incentive award, the member 114 is offered the opportunity to provide personal information in exchange for an enhanced bonus award.

Figure 6:
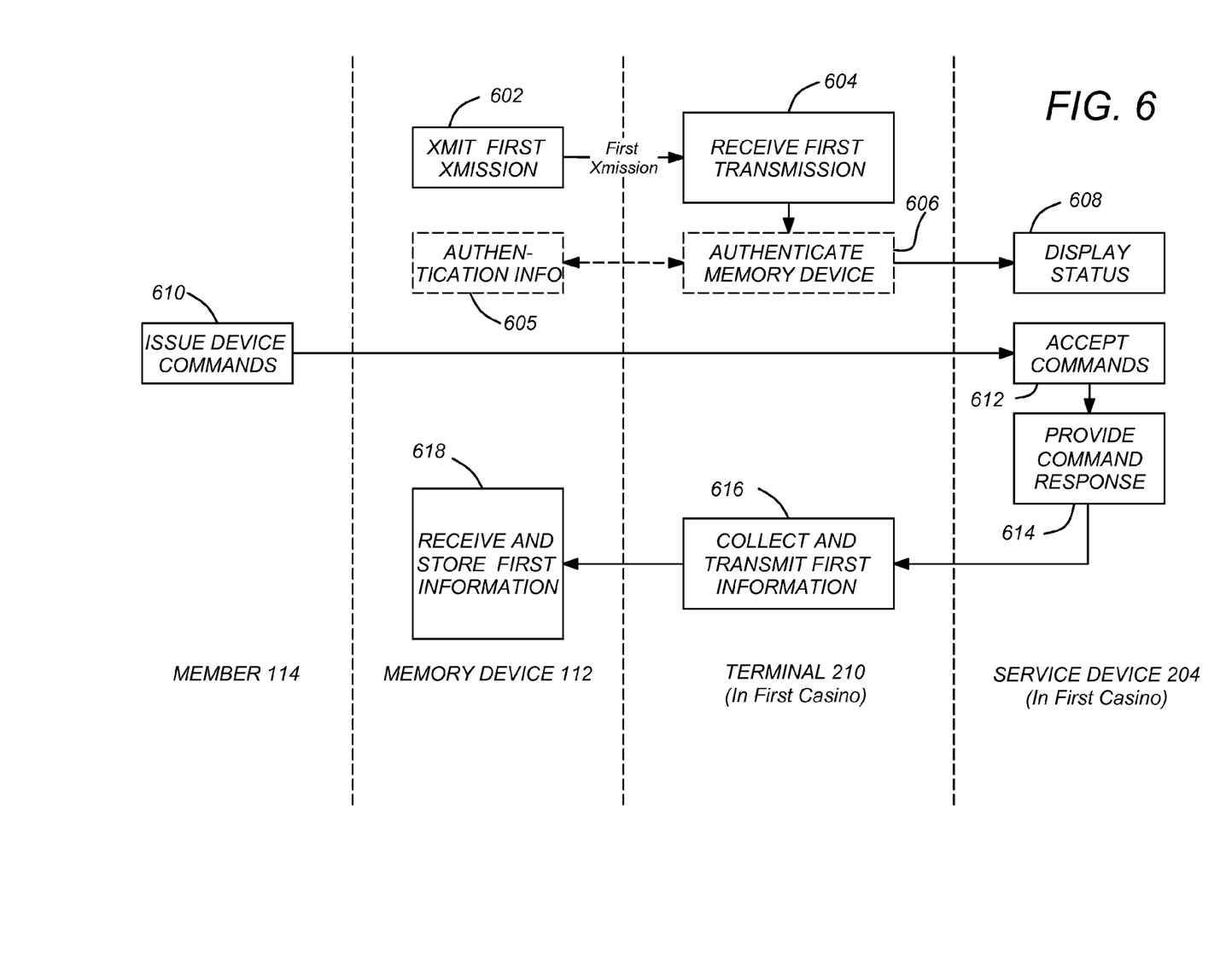
FIG. 6 is a diagram illustrating the use of the memory device to track incentives at a first casino and in which the possessor of the memory device is a member of an incentive program at the first casino.
Figure 7A:
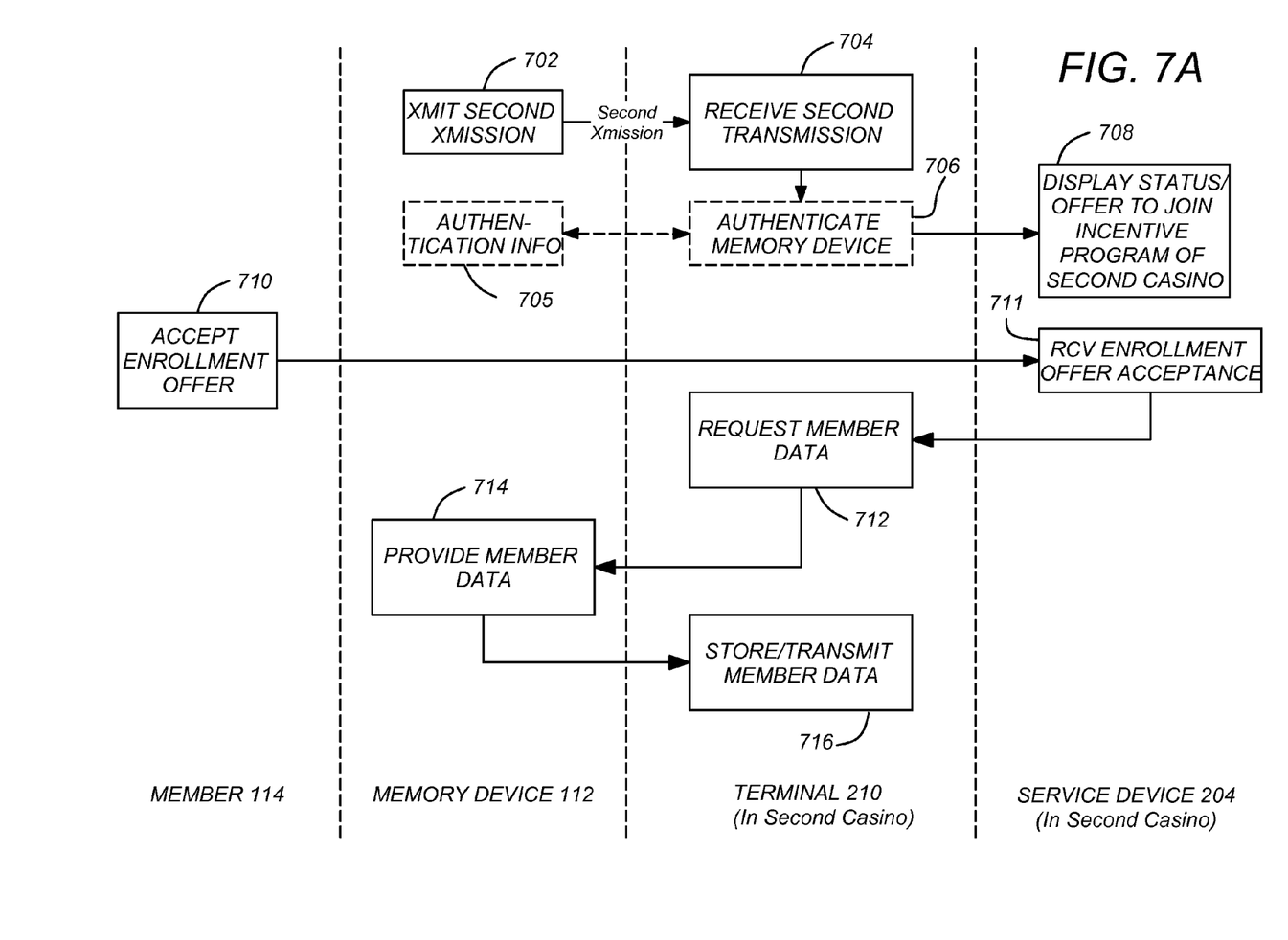
FIGS. 7A and 7B are diagrams illustrating the use of the memory device to track incentives at a second casino and in which the possessor of the memory device is not initially a member of the incentive program at the second casino.
Figure 7B:
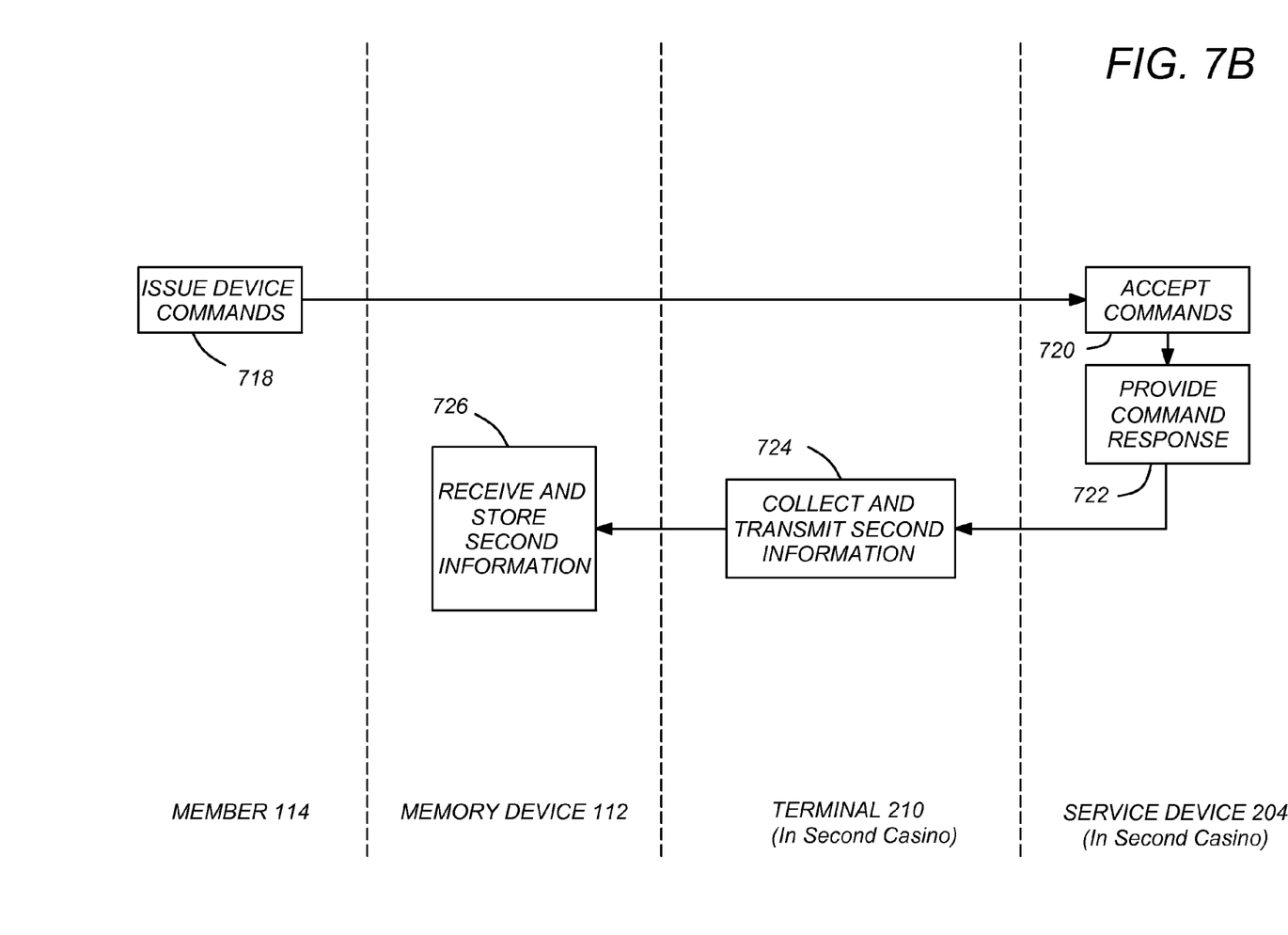
Figure 8:
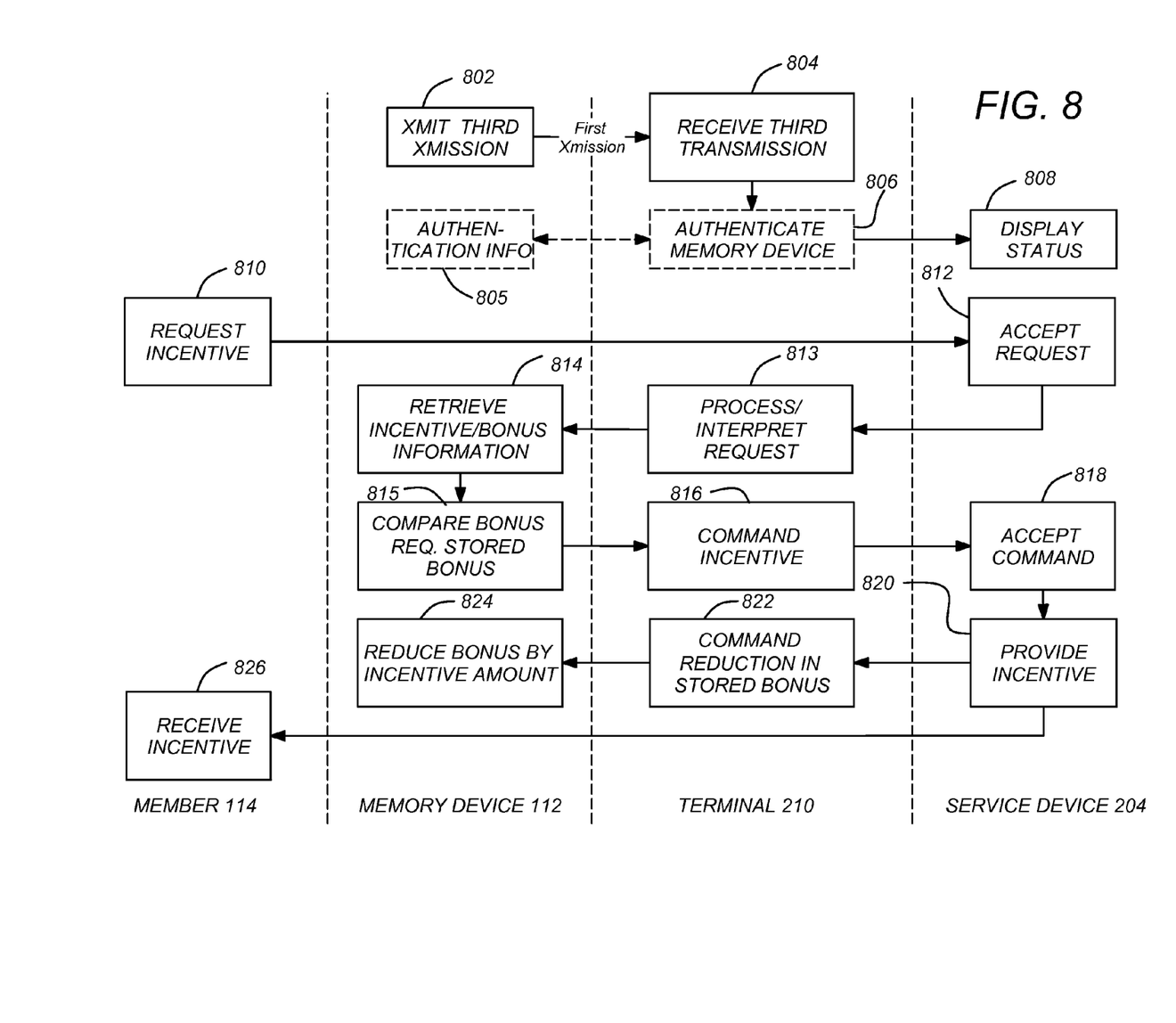
FIG. 8 is a diagram illustrating the redemption of a bonus amount to receive an incentive from the first and/or the second casino.

FIGS. 6-8 is a diagram presenting yet another embodiment in which the memory device can be used in connection with incentive programs at commercially distinct casinos. In block 602, the memory device 112 transmits a first transmission to the terminal 210.

As described above, the memory device 112 may comprise a smartcard, a USB-based flash memory, a wireless device, or any portable means to store information. The memory device 112 is issued to a person that is a member of a first incentive program offered by a first casino, typically in exchange for the member's personal information and the right to collect information regarding game play.

In one embodiment, the memory device 112 comprises a device capable of wirelessly transmitting and receiving information from other devices. One example of such a device is an infrared or optical transceiver similar to that of a remote control. One example of such a device is a radio frequency identification (RFID) device. With wireless devices, the terminal 210 or service device 204 may sense the approach of the memory device 112, and in response, present a display recognizing the member and inviting the member to use the service device 204. The member 114 may elect to do so by selecting appropriate commands on the service device 204 or the terminal 210.

In block 604, the terminal 210 receives the first transmission, which may include simply the customer unique identifier. The terminal 210 is communicatively coupled to one of a plurality of service devices 204 in a first casino.

Using authentication information received from the memory device 112, the terminal 210 (or service device 204) can authenticate the memory device before proceeding further, as shown in block 606. The result of the authentication process can be displayed on a display of the service device 204 (e.g. the display of a video gaming device).

Thereafter, the member 114 can issued device commands such as game play commands that are accepted by a service device 204 in a first casino. This is illustrated in blocks 610 and 612. The service device provides a command response (e.g. game play) as shown in block 614. The terminal 210 collects and transmits first information describing the member's gaming activity, as shown in block 616. That information is transmitted to the memory device 112, as shown in bock 618. As described above, the information may be transmitted from the terminal to the memory device 112 as it is available, may be stored in the terminal 210 an periodically transmitted to the memory device 112, or may be transmitted to the memory device when the member 114 has completed game play (for example, by providing a cashout command).

Once the member 114 has cashed out, they may deactivate the memory device 112. In embodiments wherein the memory device 112 is in the form of a smartcard or USB flash memory, this may be accomplished by removing the memory device 112 from the terminal 210. In embodiments wherein the memory device 112 communicates wirelessly with the terminal 210 (e.g. an RFID device), the user may provide a command to end the session or simply walk away until they are out of range with the terminal 210. At this point, the member may approach another service device 204 and repeat the same operations in the first casino. However, the member 114 may leave the premises of the first casino and enter a second casino that is commercially distinct from the first casino.

In this context, "commercially distinct" refers to entities that are operate independently from one another as peers. Typically, although not necessarily, such casinos are owned by separate entities.

For example, currently, Fitzgeralds Casino in Las Vegas is owned by one individual, while the Four Queens casino is owned by a different individual. Fitzgeralds and the Four Queens are operated completely independently from one another, and are therefore commercially distinct with respect to incentive programs. If Fitzgeralds and the Four Queens were to enter an agreement sharing the same incentive program, they would still be commercially distinct, because the shared incentive program exists only by virtue of an agreement between two peers . . . entities that do not control each other. Nor was the incentive program mandated by a third party that controls both entities.

Further, Caesar's Palace, the Imperial Palace, Paris Las Vegas, and Ballys are all currently controlled by Harrah's Entertainment. If Harrah's Entertainment were to institute an single incentive program valid for play at Caesar's Palace and Paris Las Vegas, Caesar's Palace and Paris Las Vegas would not be commercially distinct casinos in the context of the establishment of incentive programs because the program was mandated by a third party that controls both entities. If, however, Caesar's Palace and Paris Las Vegas were independently operated and entered into a separate agreement to share an incentive program as peers (not by mandate from the owner Harrah's Entertainment, they would be "commercially distinct."

FIGS. 7A and 7B illustrate exemplary operations that can be performed at the second casino. In block 702, a second transmission is transmitted from the memory device. Again, this transmission may or may not be a wireless transmission and may include a member-unique identifier. In block 704, the second transmission is received in a terminal 210 in the second casino. Like the terminal 210 in the first casino, the second terminal is communicatively coupled to one of a second plurality of gaming devices 204 of a second casino that is commercially distinct from the first casino. Further, the plurality of second gaming devices 204 may be communicatively isolated from any entity communicatively connected with any of the other of the plurality of second gaming devices 204, and may also be communicatively isolated from any entity communicatively connected with any of the plurality of first gaming devices 204.

In blocks 705 and 706, the memory device is optionally authenticated by the transmission, reception, and processing of authentication information.

If the member 114 of the first incentive program is also a member of a second incentive program offered at the second casino, processing moves to block 718, and the member 114 begins game play using the service device 204. As illustrated in FIG. 7B, this includes the issuance of device commands, the acceptance of those commands, and providing command responses, as shown in blocks 718-722. Second information regarding the game play is collected and transmitted to the memory device, where it is received and stored, as shown in blocks 724-726.

If the member 114 is not a member of the second incentive program offered at the second casino the service device, the service device 204 may display an offer to join the incentive program of the second casino, as shown in block 708. If the member 114 accepts the enrollment offer, the service device 203 transmits a message to the terminal 210 to command the terminal to request member data from the memory device, as shown in blocks 711 and 712. This member data may include information identifying the member. The member data is provided, as shown in block 714 and returned to the terminal 210. The member data may then be stored in the terminal 210, the service device 204, or transmitted to a centralized computer of the second casino. If desired, a message may then be presented on the service device 204, indicating that the member 114 is now also a member of the second incentive program of the second casino.

FIG. 8 is a diagram showing how the incentives earned under the first incentive program and/or the second incentive program may be provided to the member 114.

First, a third transmission is made from the memory device 112 and received in a third terminal 210, as shown in blocks 802 and 804. The third terminal may be any one of the terminals 210 in the first casino, any one of the terminals 210 in the second casino, or a specialized redemption terminal communicatively coupled to a centralized computer of the first casino and or the second casino. As before, the memory device may be optionally authenticated, as shown in blocks 805 and 806. The status (whether the memory device was recognized and/or authenticated) can be displayed by the service device, as shown in block 808.

In block 810, the member requests their incentive. In one embodiment, the incentives provided at the first casino and the second casino are coordinated. That is, the first casino and the second casino have entered an agreement to provide bonuses and incentives to members 114 based not only on the first information stored in the memory device (which information was collected in connection with game play carried out at the first casino), but also based on the second information stored in the memory device (which information was collected in connection with game play carried out at the second casino). In this embodiment, the user can retrieve incentives at one casino that were earned at another.

In another embodiment, the incentives provided at the first casino and the second casino are not coordinated. In this embodiment, the member 114 will be able to retrieve only those incentives based on first information (collected in connection with game play carried out at the first casino) if the third terminal 210 is disposed in or controlled by the first casino, and be able to retrieve only those incentives based on second information (collected in connection with game play carried out at the second casino) if the third terminal is disposed in or controlled by the first casino. In this embodiment, the member 114 can only retrieve incentives that were earned at the same casino at which the game play occurred.

The incentive request is accepted by the service device 204, as shown in block 812. The terminal 210 processes and interprets that request, and commands the memory device 112 to retrieve incentive/bonus information stored therein, as shown in blocks 814. In one embodiment, the memory device 112 acts as a repository for stored bonuses only. In this embodiment, the memory device 112 simply provides the stored first and/or second information regarding game play to the terminal, and the terminal (or service device 204) determines the bonus/incentive. In another embodiment, the memory device 112 determines the bonus by a comparison of the stored first and/or second information and bonus/incentive requirements stored in the memory device 112 as shown in block 815. In either case, using either the incentive information or the comparison between the incentive information and requirements, the memory device 112 sends a message to the terminal 210 indicating whether the incentive should be provided to the member, and the terminal 210 provides a command to the service device 204 indicating that the incentive should be provided. The service device 204 accepts the command and provides the incentive, as shown in blocks 818, 820, and 826. The service device 204 sends a message to the terminal 210 to indicate that the incentive was provided. The terminal 210 commands the memory device 112 to reduce the cumulative bonus for the member stored therein by the amount provided in the incentive in block 820, and the memory device 112 respond to this command. This is illustrated in blocks 822 and 824. If desired, the foregoing process can be altered so that the incentive is not provided until after the bonus is reduced by the incentive amount.

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of providing gaming incentives, comprising the steps of:
   receiving a first transmission from a secure memory device in a terminal communicatively coupled to one of a plurality of first gaming devices of a first casino;
      wherein the secure memory device is issued to a member of a first incentive program of the first casino, the memory device having a secure memory for storing and retrieving tamperproof customer incentive information and a customer-unique identifier;
      wherein the terminal exchanges information between the secure memory device and the one of the plurality of gaming devices;
      wherein the plurality of first gaming devices includes at least a subset of first gaming devices that are communicatively isolated from any entity communicatively connected with any of the other of the plurality of first gaming devices
   collecting first information describing member-related gaming device activity of the one of the plurality of first gaming devices;
   securely transmitting the first information regarding the member-related gaming device activity to the memory device for storage in the secure memory;
   receiving a second transmission from the secure memory device in a second terminal communicatively coupled to one of a second plurality of gaming devices of a second casino commercially distinct from the first casino;
      wherein the second terminal exchanges information between the secure memory device and the one of the second plurality of gaming devices;
      wherein the plurality of second gaming devices includes at least a subset of second gaming devices that are communicatively isolated from any entity communicatively connected with any of the other of the plurality of second gaming devices;
   enrolling the member of the first incentive program of the first casino in a second incentive program of the second casino;
   collecting second information describing member-related gaming device activity of the one of the second plurality of gaming devices of the second casino;
   securely transmitting the second information regarding the member-related gaming device activity to the memory device for storage in the secure memory.

2. The method of claim 1, wherein the secure memory device comprises a radio frequency identification (RFID) device.

3. The method of claim 2, wherein the RFID device is an active RFID device.

4. The method of claim 1, wherein the first incentive program of the first casino and the second incentive program of the second casino are coordinated, and the method further comprises the steps of:
   receiving a third transmission from the secure memory device in a third terminal communicatively coupled to another one of the plurality of first gaming devices of the first casino or to another one of the plurality of second gaming devices of the second casino;
   receiving a request in the third terminal to issue an incentive based on the first information and the second information; and
   providing the requested incentive.

5. The method of claim 4, wherein the incentive is based only on data received from the secure memory device.

6. The method of claim 1, wherein the first incentive program of the first casino and the second incentive program of the second casino are not coordinated, and wherein the method further comprises the steps of:
- receiving a third transmission from the secure memory device in a third terminal communicatively coupled to another one of the plurality of first gaming devices of the first casino;
- receiving a request in the third terminal to issue an incentive based on the first information; and
- providing the incentive.

7. The method of claim 6, wherein the incentive is based only on data received from the secure memory device.

8. The method of claim 1, wherein the first transmission, second transmission, and the third transmission identifies the secure memory device and does not identify the member.

9. The method of claim 1, wherein:
- the second transmission comprises member-identifying data, and
- the step of enrolling the member of the first incentive program of the first casino in the second incentive program of the second casino comprises the steps of:
  - transmitting the member-identifying data to from the second terminal to a centralized computer of the second casino.

10. The method of claim 9, further comprising the step of:
- securely transmitting second incentive program information to the memory device for storage in the secure memory.

11. An apparatus for providing gaming incentives, comprising the steps of:
- means for receiving a first transmission from a secure memory device in a terminal communicatively coupled to one of a plurality of first gaming devices of a first casino;
  - wherein the secure memory device is issued to a member of a first incentive program of the first casino, the memory device having a secure memory for storing and retrieving tamperproof customer incentive information and a customer-unique identifier;
  - wherein the terminal exchanges information between the secure memory device and the one of the plurality of gaming devices;
  - wherein the plurality of first gaming devices includes at least a subset of first gaming devices that are communicatively isolated from any entity communicatively connected with any of the other of the plurality of first gaming devices
- means for collecting first information describing member-related gaming device activity of the one of the plurality of first gaming devices;
- means for securely transmitting the first information regarding the member-related gaming device activity to the memory device for storage in the secure memory;
- means for receiving a second transmission from the secure memory device in a second terminal communicatively coupled to one of a second plurality of gaming devices of a second casino commercially distinct from the first casino;
  - wherein the second terminal exchanges information between the secure memory device and the one of the second plurality of gaming devices;
  - wherein the plurality of second gaming devices includes at least a subset of second gaming devices that are communicatively isolated from any entity communicatively connected with any of the other of the plurality of second gaming devices;
- means for enrolling the member of the first incentive program of the first casino in a second incentive program of the second casino;
- means for collecting second information describing member-related gaming device activity of the one of the second plurality of gaming devices of the second casino;
- means for securely transmitting the second information regarding the member-related gaming device activity to the memory device for storage in the secure memory.

12. The apparatus of claim 11, wherein the secure memory device comprises a radio frequency identification (RFID) device.

13. The apparatus of claim 12, wherein the RFID device is an active RFID device.

14. The apparatus of claim 11, wherein the first incentive program of the first casino and the second incentive program of the second casino are coordinated, and the apparatus further comprises:
- means for receiving a third transmission from the secure memory device in a third terminal communicatively coupled to another one of the plurality of first gaming devices of the first casino or to another one of the plurality of second gaming devices of the second casino;
- means for receiving a request in the third terminal to issue an incentive based on the first information and the second information; and
- means for providing the requested incentive.

15. The apparatus of claim 14, wherein the incentive is based only on data received from the secure memory device.

16. The apparatus of claim 11, wherein the first incentive program of the first casino and the second incentive program of the second casino are not coordinated, and wherein the apparatus further comprises:
- means for receiving a third transmission from the secure memory device in a third terminal communicatively coupled to another one of the plurality of first gaming devices of the first casino;
- means for receiving a request in the third terminal to issue an incentive based on the first information; and
- providing the incentive.

17. The apparatus of claim 16, wherein the incentive is based only on data received from the secure memory device.

18. The apparatus of claim 11, wherein the first transmission, second transmission, and the third transmission identifies the secure memory device and does not identify the member.

19. The apparatus of claim 11, wherein:
- the second transmission comprises member-identifying data, and
- the means for enrolling the member of the first incentive program of the first casino in the second incentive program of the second casino comprises:
  - means for transmitting the member-identifying data to from the second terminal to a centralized computer of the second casino.

20. The apparatus of claim 19, further comprising:
- means for securely transmitting second incentive program information to the memory device for storage in the secure memory.

* * * * *